United States Patent [19]
Howard

[11] 3,870,453
[45] Mar. 11, 1975

[54] ADJUSTMENT MECHANISM FOR AN EXTRUDER DIE

[75] Inventor: Walter B. Howard, Lima, Ohio

[73] Assignee: National-Standard Company, Lima, Ohio

[22] Filed: Oct. 15, 1973

[21] Appl. No.: 406,185

[52] U.S. Cl. ................................ 425/465, 425/466
[51] Int. Cl.... A01j 21/00, A01j 25/12, B28b 21/52
[58] Field of Search .................... 425/466, 381, 465

[56] References Cited
UNITED STATES PATENTS

| | | | |
|---|---|---|---|
| 2,026,740 | 1/1936 | Kinsella et al. | 425/466 |
| 3,093,860 | 6/1963 | Eilersen | 425/466 |
| 3,096,543 | 7/1963 | Konopacke et al. | 425/466 |
| 3,195,183 | 7/1965 | Phillips | 425/466 |
| 3,377,655 | 4/1968 | Kucharski et al. | 425/466 |

Primary Examiner—James L. Jones, Jr.
Attorney, Agent, or Firm—Johnson, Dienner, Emrich & Wagner

[57] ABSTRACT

The uniform thickness of a continuous strip of extruded material is now maintained by passing the extrudate through a die having an adjustable die opening, gauging the thickness of the strip and varying the width of the die opening to maintain the strip at a desired thickness along its length. A die plate displacement means controls the position of a movable die plate relative to a stationary die plate to adjust the width of the die opening, and a manual setting means is operatively connected to the die plate displacement means in such a manner to effect incremental displacement of the movable die plate towards or away from the stationary die plate.

6 Claims, 5 Drawing Figures

PATENTED MAR 11 1975 3,870,453

ADJUSTMENT MECHANISM FOR AN EXTRUDER DIE

BACKGROUND OF THE INVENTION

In the state of the art of extruder and die apparatus, such as disclosed in U.S. Pat. No. 3,407,441, a die of appropriate configuration is clamped on the discharge end of the extruder to form the discharge material into the desired cross-sectional configuration for a tire tread. The tread stock issues from the discharge end in the form of a continuous tread strip which is conveyed into an accumulator unit, and from the accumulator unit the strip material is fed to a tire carcass supported on a tread applicator device.

To build a high quality tire it is essential that the cross-sectional dimensions along the continuous strip be substantially constant. The difficulty that arises in operating the prior art extruder apparatus is that the thickness of the extrudate varies in an unpredictable fashion due to a number of different but interrelated factors, such as changes in ambient temperature, chemical composition variations of the extruded material, etc. In the prior art extruding apparatus there is no way to compensate for these dimensional variations without stopping the extrusion process and replacing the die.

SAMMARY OF THE INVENTION

The thickness of a continuous strip of extruded material is maintained by passing the extrudate through a die having an adjustable die opening, gauging the thickness of the strip and varying the width of the die opening to maintain the strip at a desired thickness along its length. An adjustment means is provided for incrementally varying the width dimension of the die opening by controlling the vertical position of a movable die plate relative to the stationary die plate.

DESCRIPTION OF THE DRAWINGS

For a better understanding of this invention reference may be made to the accompanying drawings, in which.

DESCRIPTION OF THE PREFERRED EMBODIMENT

Figure 1:
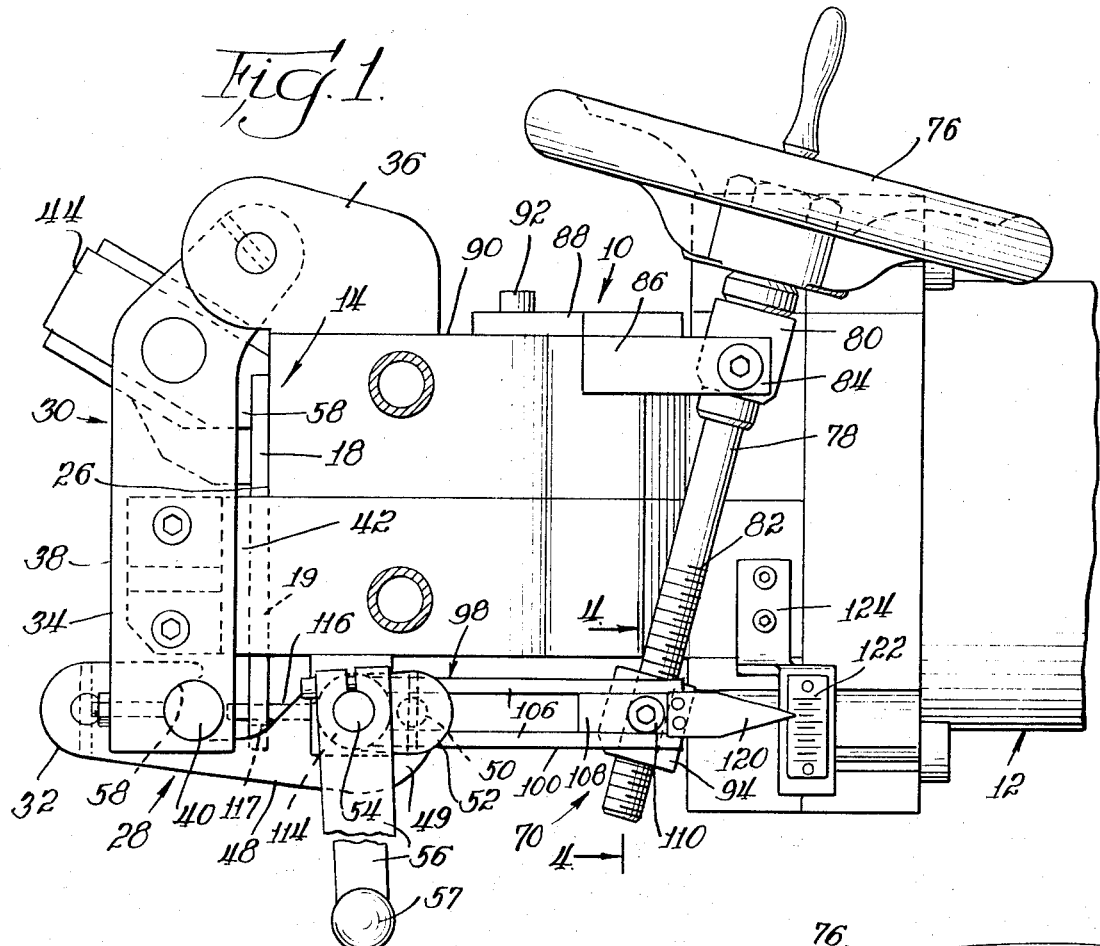
FIG. 1 is a side elevational view of the adustment means of the present invention mounted at the discharge end of an extruder having a locking mechanism for mounting a pair of die plates.
Figure 2:
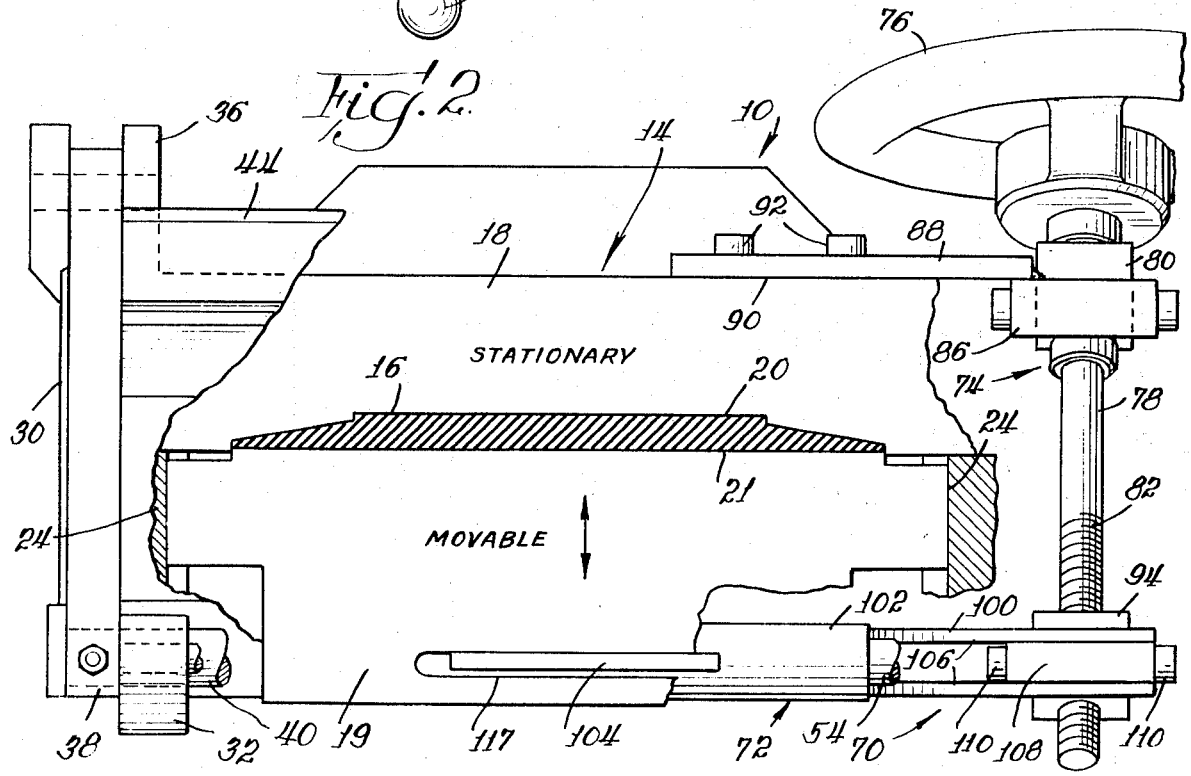
FIG. 2 is a front elevational view of FIG. 1 with the locking mechanism shown partially broken away to illustrate the pair of die plates.
Figure 3:
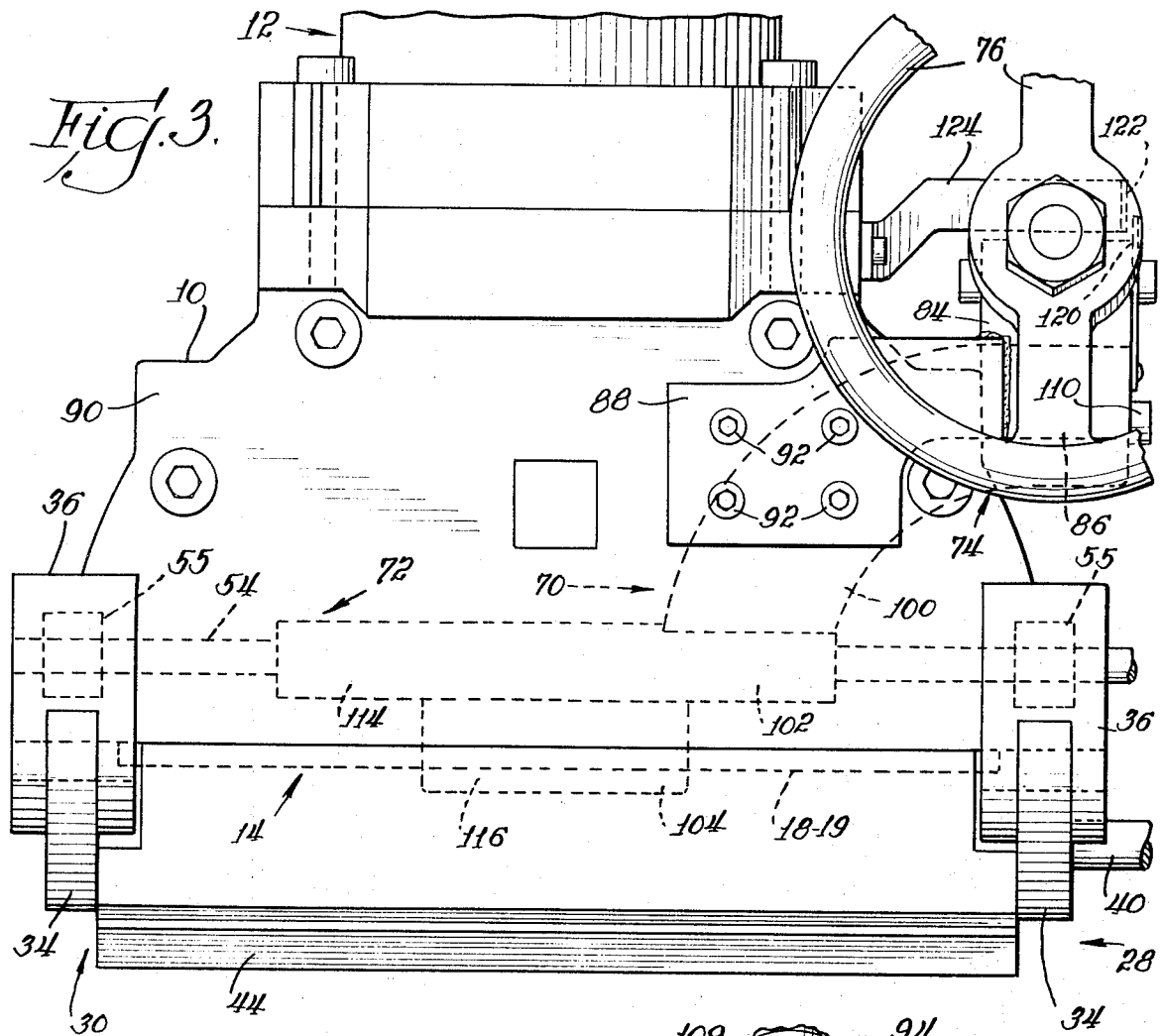
FIG. 3 is a top plan view of FIG. 1 with the hidden parts of the adjustment means shown in dotted lines.

Referring now to FIGS. 1 and 3 of the drawings, there is shown the forward end 10 of a conventional and known extruder 12. The extruder 12 could be of any known construction for heating and macerating tire tread stock material for discharge through a die 14, which forms a continuous strip of tire tread material conforming to the cross-sectional configuration of die opening 16 (FIG. 2). Die 14 (FIG. 2) is made up of upper stationary die plate 18 and lower movable die plate 19 in which the opposing marginal edges 20 and 21 of die plates 18 and 19, respectively, define die opening 16. The lower movable die plate 19 is slidably disposed between a pair of spaced vertical guide posts 24 which are mounted on the forward discharge end face 26 of the extruder 12.

The upper stationary die plate 18 extends between and rests on the upper ends of the pair of vertical guide posts 24 and can be held in a fixed position by locking mechanism 28, which consists of a gate assembly 30 and a latch assembly 32. The gate assembly 30 has a frame member 34 which is pivotally mounted on a pair of hinge support members 36 at the upper forward edge of forward end 10. Frame member 34 is constructed as a pair of arm members 38 pivotally mounted on two hinge support members 36, and the following members are secured crosswise therebetween: a locking bar 40 disposed between the outer free ends of arm members 38, a vertical guide plate 42 above locking bar 40, and a clamping member 44 above the guide plate 42. In the downward clamping position of FIG. 1, guide plate 42 is placed in a sliding relationship with movable die plate 19 to guide its movement in a vertical plane, and clamping member 44 engages and rigidly holds stationary die plate 18.

Latch assembly 32 comprises a latching frame 48 having a pair of latching arms 49 pivotally mounted on pivot pin 50. Pivot pin 50 is secured to the free ends of a pair of spaced lever members 52 defining lever means keyed to crankshaft 54. Crankshaft 54 extends transversely across forward end 10 of the extruder and is supported for rotation in a pair of spaced apart bearing blocks 55 (FIG. 3) secured to the bottom surface of the forward end 10. A crank handle 56 is keyed to the outer end of shaft 54 and is provided with a handle 57 to effect rotation of crank shaft 54. At the free end of both latching arms 49 there is provided an inturned C-shaped surface 58 of conforming shape to the peripheral surface of locking bar 40.

With the gate means 30 swung upwardly to a position disposed above the forward end 10, the fixed and movable die plates 18 and 19, respectively, may be readily inserted or removed from their mounting position between vertical posts 24. When the two dies are in place, gate frame 30 may be manually rotated about the axis of two hinge support members 36 to dispose the gate frame in downward hanging position. In this position of the parts, clamping member 44, which includes a spring-biased plunger means 58, engages the stationary die plate 18. Latching frame 48 is then swung clockwise (as viewed in FIG. 1) and crank handle 57 is rotated counterclockwise to provide pressure engagement of the clamping member 44 with the stationary die plate 18. Guide plate 42 is brought to a close juxtaposition with movable die plate 19 to provide a sliding relation therebetween.

The foregoing description forms no part of my invention and is given only for the purpose of clearly understanding the preferred embodiment of my invention, which will now be described. The foregoing described die 14 and locking mechanism 28 are similar to those disclosed in U.S. Pat. No. 3,407,411 which issued to V. C. Vigansky and Edwin E. Mallory on Oct. 29, 1968, except that the Vigansky et al patent does not have a movable die plate to allow varying the die opening. In this invention a movable die plate 19 is utilized and a die opening adjustment means 70 is operatively connected to this plate for selectively varying its position relative to the stationary die plate 18. Die opening adjustment mechanism 70 comprises a die plate displacement means 72 for vertical movement of die plate 19 and a setting means 74 operatively connected to the die plate displacement means 72. Setting means 74 is shown in FIGS. 1 and 2 as constructed of a handwheel 76 fixed on the upper end of an elongated shaft member 78 in which the shaft member is rotatably supported through a sleeve bearing 80 adjacent the handwheel and has a threaded shank portion 82. Sleeve bearing 80 is pivotally mounted within the clevis portion 84 of a mounting bracket 86 which is formed with an offset base plate 88 fastened to the top surface 90 of discharge end 10 by four mounting bolts 92 (FIG. 3).

Figure 4:
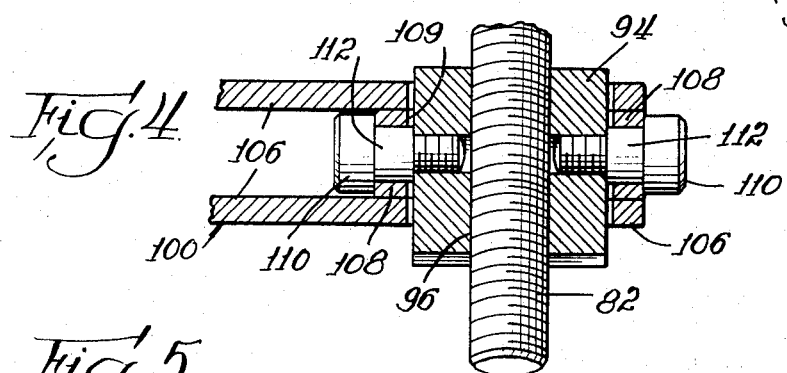
FIG. 4 is a cross-sectional view taken along the line 4—4 of FIG. 1 and looking in the direction of the arrows illustrating the pivotal connection between the die plate displacement means and the manual setting means.
Figure 5:
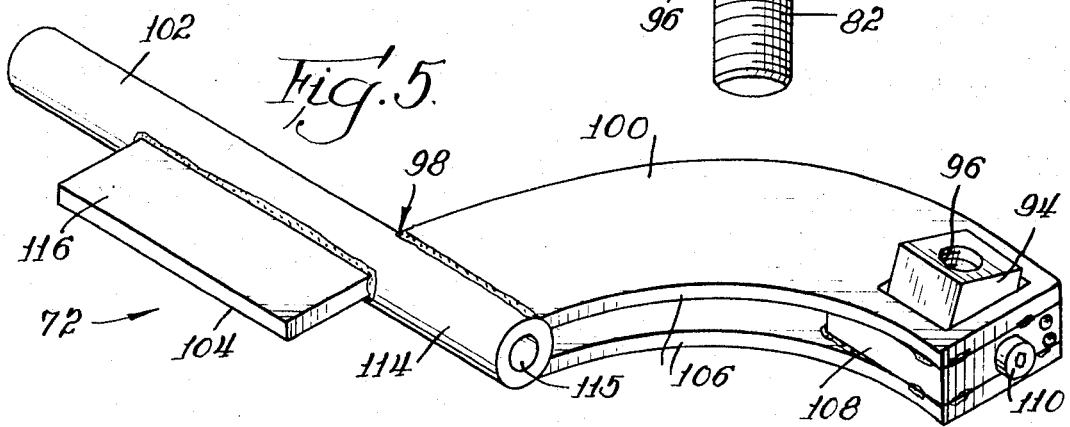
FIG. 5 is a perspective view of the die plate displacement means.

Die plate displacement means 72 is operatively connected to the setting means 74 via a coupler block 94 having a threaded bore 96 (FIG. 4) through which is screwed threaded shank portion 82. Coupler block 94 is pivotally supported at one end of the die plate control member 98 (FIG. 5), which comprises an arcuate shank portion 100, a pivot base portion 102 and a die plate engaging portion 104. The arcuate shank portion 100 is constructed of two spaced apart curved plates 106 bending through an approximately ninety-degree angle which are separated at one end by spacer block 108 and are secured, as by welding, at their other end to pivot rod 102. Spacer block 108 is formed with a large square opening 109 in its mid-section and a pair of bolts 110 are threaded through openings in its opposite side walls for pivotally mounting the coupler block 94. The shoulder 112 of the two bolts 110 serve as a bearing means for accommodating pivotal movement of coupler block 94.

Pivot portion 102 is shown as a hollowed center rod 114 in which its axial bore 115 is rotatably disposed over crank shaft 54. Die plate engaging portion 104 is shown as a flat rectangular plate 116 secured, as by welding, to the outer cylindrical surface of pivot rod 114 and adapted to project through a long narrow rectangular slot 117 in the lower end movable die plate 19.

From the foregoing description it will be appreciated that an incremental upward or downward displacement of movable die plate 19 can be made by turning handwheel 76. For the operator to determine the amount of movement of plate 19 a gauge means is provided by attaching a pointer 120 to the side of coupler block 94 such that its pointed end traverses along an indicator scale 122 attached to the side of the forward end 10 by a mounting bracket 124.

Although setting means 74 is illustrated as manually operated, it will be appreciated that it could be power operated by means of any of a number of well known hydraulic or electric driven devices. Further, any of a number of commercially available thickness measuring devices could be used to monitor the thickness of the extruded trip and to provide a control signal proportional to the difference between the desired thickness and the actual thickness. The control signal would then be used to energize the power operated setting means to provide the necessary incremental displacement of movable die plate 19.

While I have illustrated and described what I regard to be the preferred embodiment of the invention, nevertheless it will be understood that such is merely exemplary and that numerous modifications and rearrangements may be made therein without departing from the invention.

I claim:

1. An adjustment mechanism for use with an extruder having a die supporting means for supporting a two-plate die at the discharge outlet of said extruder with one plate held stationary and the other disposed in a sliding relation toward and away from said one plate, the opposing marginal edge of said plates defining a die opening whose width dimension varies by sliding displacement of said other plates, comprising a die plate displacement means for controlling the position of said other die plate relative to said one die plate, setting means operatively connected to said die plate displacement means for effecting movement of said other die plate to selectively set the width of said die opening, gauge means for providing a visual indication of the amount of displacement of said other die plate, said gauge means comprising an elongated incremental scale mounted on said extruder and a pointer operatively connected to said setting means in a manner to traverse across said scale in proportion to displacement of said other die plate.

2. An adjustment mechanism for use with an extruder having a die supporting means for supporting a two-plate die at the discharge outlet of said extruder with one plate held stationary and the other disposed in a sliding relation toward and away from said one plate, the opposing marginal edge of said plates defining a die opening whose width dimension varies by sliding displacement of said other plate, comprising a die plate displacement means for controlling the position of said other die plate relative to said one die plate, setting means operatively connected to said die plate displacement means for effecting movement of said other die plate to selectively set the width of said die opening, and wherein said other die plate includes an elongated slot extending perpendicular to a path of sliding movement and wherein said die plate displacement means comprises a die plate control member having a base rod portion pivotally mounted on an axis extending parallel to the plane of said other die plate and having a die plate engaging portion extending radially from said base rod portion through said elongated slot, said base rod portion including a shank portion extending radially away from said base rod portion, and a coupler block pivotally mounted adjacent the outer end of the shank portion for connection with said setting means.

3. An adjustment mechanism as defined in claim 2 wherein said setting means comprises an elongated shaft member having a handwheel fixed to its upper end and having its lower end in threaded engagement with said coupler block and means for pivotally mounting the upper end of said shaft member in a free turning relation.

4. An adjustment mechanism for use with an extruder having a die supporting means for supporting a two-plate die at the discharge outlet of said extruder with one plate held stationary and the other plate disposed in a sliding relationship toward and away from said one plate, the opposing marginal edge of said plates defining a die opening whose width dimension varies by the sliding displacement of said other plate, said other die plate having an elongated slot, said adjustment means comprising a die plate displacement means for controlling the position of said other die plate relative to said one die plate, said die plate displacement means including a die plate engaging portion extending through said elongated slot in said other plate, and manual setting means operatively connected to said die plate displacement means for effecting movement of said die plate engaging portion in a manner to incrementally move said other die plate toward or away from said one die plate.

5. Ad adjustment mechanism as defined in claim 4, further comprising gauge means for providing a visual indication of the amount of displacement of said other die plate.

6. An adjustment mechanism as defined in claim 5 wherein said gauge means comprises an elongated incremental scale supported from said extruder and a pointer carried by said manual setting means such that said pointer traverses across said scale in proportion to the displacement of said other die plate.

* * * * *